Jan. 19, 1943. E. F. RIESING 2,308,969
RESILIENT MOUNTING
Filed June 10, 1941
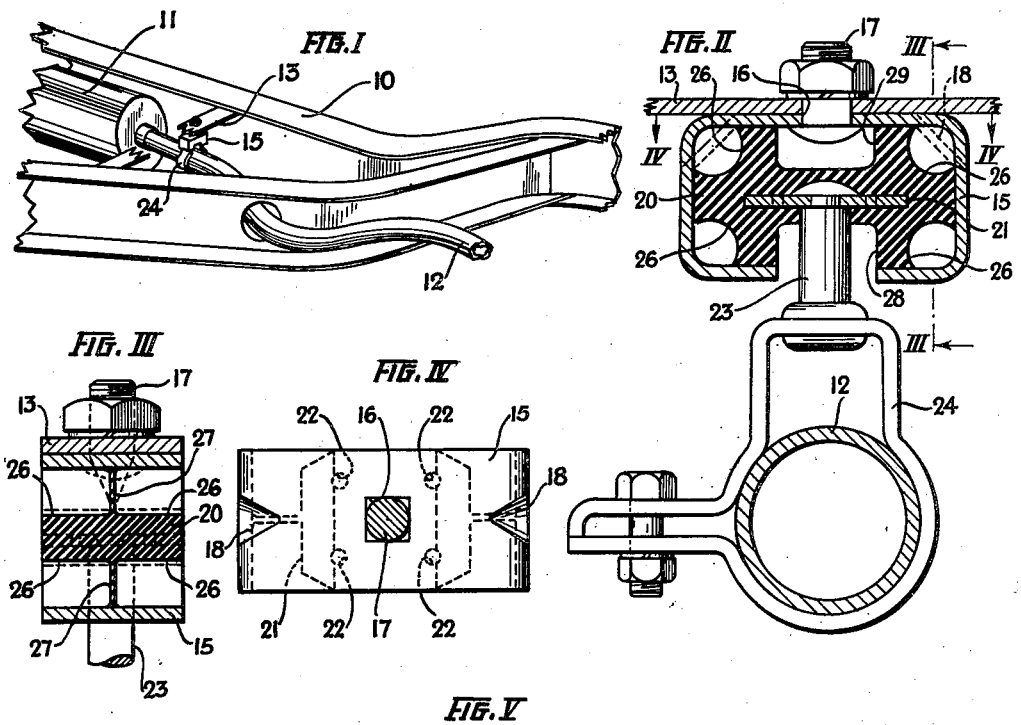
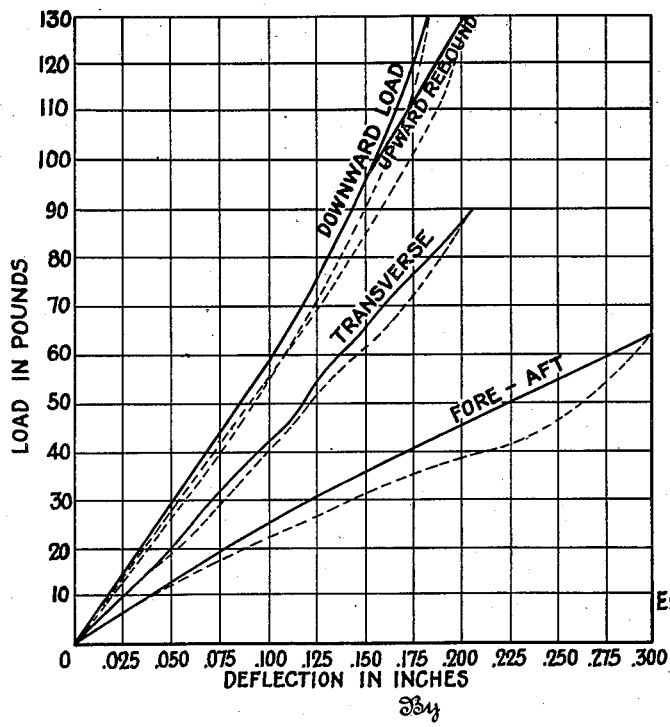
Inventor
ELLWOOD F. RIESING Patented Jan. 19, 1943

2,308,969

UNITED STATES PATENT OFFICE 2,308,969

RESILIENT MOUNTING

Ellwood F. Riesing, Akron, Ohio, assignor to The Firestone Tire & Rubber Company, Akron, Ohio, a corporation of Ohio Application June 10, 1941, Serial No. 397,419

2 Claims. (Cl. 248—54)

This invention relates to resilient mountings, and more especially it relates to resilient mountings for supporting pipes and the like in situations where there is considerable movement or vibration of the pipes relatively of the structures that support them.

The invention is of primary utility in the mounting of the muffler and exhaust pipe of a motor vehicle, especially in vehicles which have the motor supported on rubber mountings whereby it is free to vibrate relatively of the frame of the vehicle. In installations of the character mentioned, there is also vibration arising from the passage of the vehicles over uneven roadways. The invention also contemplates that there will be movement in the exhaust pipe and muffler relatively of the vehicle frame when the latter is sprung out of alignment, as when a wheel of the vehicle passes over an obstruction. The invention also is designed in view of conditions arising when the exhaust pipe is longitudinally elongated as the result of thermal expansion due to hot gases from the vehicle motor.

The chief objects of the invention are to provide a mounting for the suspending of an exhaust pipe and muffler in such a manner as to reduce to the minimum the transmission of high frequency vibrations and noises generated by the explosions in the engine cylinders, and the breaking down of the explosion noises in the muffler; to provide a safety construction whereby there will not be complete separation of the supported and the supporting elements upon complete failure of the rubber that constitutes the resilient element of the mounting; to provide a resilient mounting of the character mentioned whereby elongation of an exhaust pipe due to thermal expansion acts only to deform the rubber of the mounting and puts no strain on the metal elements thereof; and in general to provide a resilient mounting for the purpose set forth that will function in a superior manner as compared to structures heretofore provided for this purpose. Other objects will be manifest as the description proceeds.

Of the accompanying drawing,

Figure I is a perspective view of an exhaust pipe, a muffler, and a portion of a vehicle frame, and an improved resilient mounting operatively interposed between said vehicle frame and exhaust pipe;

Figure II is a central vertical section through the improved mounting and parts to which it is connected;

Figure III is a section on the line III—III of Figure II;

Figure IV is a plan of the improved mounting as viewed from the line IV—IV of Figure II; and Figure V is a graph showing the deflection of the mounting under various stresses to which it is subjected.

Referring to Figure I of the drawing, there is shown a portion of a vehicle frame 10, a portion of an exhaust muffler 11, and a longitudinal portion of exhaust pipe 12 connected to one end of the muffler 11. It will be understood that the other end of the pipe 12 has connection with the exhaust manifold of a vehicle engine or motor (not shown). The exhaust pipe 12 is supported by the frame 10 through the agency of a plurality of the improved resilient mountings that are positioned at spaced points longitudinally of the pipe. One of said mountings is shown in Figure I, the same being connected to said pipe and supported on the under side of a cross-piece 13 that is secured to said frame.

As shown in Figs. II, III, and IV, the improved resilient mounting comprises a generally C-shaped metal bracket or shell 15, preferably composed of tempered steel that has been brass plated. The bracket is arranged to be mounted with its open side disposed downwardly, its opposite side, which is disposed at the top of the mounting, being centrally formed with a square aperture 16 in which the square shank of a bolt 17 is swedged, said bolt being provided for securing the mounting to the cross-piece 13. The latter also is provided with a square aperture through which the square shank of the bolt extends, the arrangement being such as to prevent angular movement of the mounting relatively of the cross-piece 13. The upper corners of the bracket 15 are centrally indented, as at 18, 18, to reinforce said corners and prevent spreading of the downwardly extending end portions of the bracket.

Positioned within the outline of the bracket or shell 15 is a body of resilient rubber composition 20 that is bonded to the inner face of the bracket by vulcanization, the lateral faces of the rubber body being flush with the lateral margins of the bracket 15. Vulcanized centrally within the rubber structure 20 is a metal plate or insert 21, said insert being formed with a plurality of apertures 22, 22 through which the rubber of the body 20 extends to provide a mechanical interlock of the insert and rubber. Riveted to the insert 21, at the middle thereof, is a metal stem or stud 23, which stem extends downwardly from the insert, passing between the spaced-apart, confronting end-margins of the bracket 15. Secured to the lower end of the stem 23 is a clamp member 24 that embraces the exhaust pipe 12 whereby the latter is suspended from the cross-piece 13 through the agency of the resilient mounting. The insert 21 is of the same width as the metal strap that constitutes the bracket 15, and is disposed parallel to the top and bottom sides of the latter, the lateral margins of the insert thus being flush with the lateral faces of the rubber body 20. In length the insert 21 is somewhat shorter than the length of said bracket so that its end margins are spaced a substantial distance from the end-walls of the bracket, but it is somewhat longer than the space between the confronting end-margins of the bracket so that the insert overlies the end portions of the bracket at each side of said space. The arrangement constitutes a safety feature that prevents separation of the bracket 15 and insert 21 in the event of complete failure of the rubber body 20.

The resilient mounting and the pipe 12 are so positioned relatively of each other that the long dimensions of the bracket 15 and the insert 21 extend transversely of the exhaust pipe 12, the exposed lateral faces of the rubber body 20 fronting fore and aft with relation to said pipe.

The rubber body 20 does not completely fill the space within the confines of the bracket 15, but is formed with suitable recesses that enable deformation and flow of the rubber under stress, and increase the resilience of the body. Thus at the four corners of the bracket 15 the rubber body is formed with recess 26, 26 that extend in fore-and-aft direction completely through the rubber body except for relatively thin webs of material 27, Fig. III midway between the outer ends of said recesses. There is a recess 28 that extends into the rubber body from the bottom thereof, the recess extending in fore-and-aft direction from one lateral face of the body to the other, the width of the recess being the same as the space between the confronting end-margins of the bracket 15. In depth the recess 28 extends about two-thirds the distance from the bottom of the rubber body 20 to the insert 21 therein. In like manner a recess 29 is formed centrally in the top of the rubber body, said recess extending from one lateral face of the body to the other, and being of the same width and depth as the recess 28. The arrangement is such that the insert 21 has substantially an equal amount of rubber above and below the same, the rubber covering the head of the stem 23 on the top of the insert and thus providing a cushion so that said head does not strike the head of the bolt 17 upon extreme upward deflection of the insert 21.

Thus it will be seen that the resilient mounting is adapted in a superior manner to oppose vibration of the exhaust pipe in different directions. In considering the various vibratory movements of the exhaust pipe, vertical movement of the pipe away from the mounting is designated "downward load," vertical movement of the pipe upwardly toward the mounting is designated "upward rebound," axial movement of the pipe, due to thermal expansion and contraction thereof is designated "fore-and-aft" movement, and lateral movement of the pipe is known as "transverse" movement. The presence of the recesses 26, 28 and 29 in the rubber body 20 cause the latter to function in a superior manner as compared to conventional resilient mountings of the compression-tension type, the results being comparable to resilient mountings wherein the strains on the resilient body place the resilient material in a condition of shear. This feature of the invention will be apparent from an examination of the graph shown in Fig. V wherein it will be seen that the "downward load" curve and the "upward rebound" curve are coincident when the mounting is under loads of less than 90 pounds. Since the static load of the exhaust pipe 12 on each mounting is but 10 to 15 pounds, it will be apparent that the load and rebound strains on the resilient element of the mounting will be equal under all normal operative conditions. Also it will be observed that the "curves" generated by load and rebound up to 100 pounds are substantially straight lines, which indicates that deflection resulting from the loads stated proceeds substantially at a uniform rate. The graph also shows that deflection of the resilient element under "for-and-aft" strains and "transverse" strains proceeds at a uniform rate, and that the rate of deflection under the last mentioned strains is relatively high as compared to deflection resulting from load and rebound strains, thus indicating that the mounting has greater resilience in fore-and-aft and transverse directions. Since the insert 21 does not approach any part of the bracket 15 during fore-and-aft vibration, it will be evident that such vibration imposes only shear strains upon the rubber body 20. The broken lines of the graph are recovery curves after deflection, which curves are not coincident with the full line curves because of hysteresis.

The rubber of the resilient body 20 is relatively soft, preferably being of 30 to 40 durometer hardness. This softness of the rubber, in combination with the particular construction and arrangement of the mounting produce a degree of resilience not found in similar mountings heretofore provided, and the deflection indicated by each curve of the graph is relatively high as compared to the deflection in conventional mountings. Because the rate of vibration of an element is inversely proportional to its rate of deflection, it follows that the rate of vibration of the insert 21 will be relatively low. The mounting is so constructed that the rate of vibration of the insert 21 is substantially less than the normal vibration of the exhaust pipe 12 or muffler 11 suspended therefrom, as the same are vibrated by the explosions in the cylinders of the vehicle motor and the gyratory movement of the latter. Thus the high frequency vibrations of the supported structures are not transmitted to the frame of the vehicle, and quieter riding is assured.

The improved mounting enables the exhaust pipe to elongate due to heat expansion without imposing undue strain upon any of the elements of the mounting. Also there can be no separation of the insert 21 from the bracket 15 even upon complete failure of the resilient body 20. Furthermore, the bracket 15 serves to protect the rubber body 20 from the heat of the exhaust pipe 12, thus lengthening the useful life of the mounting.

Modification may be resorted to without departing from the spirit of the invention, or the scope thereof as defined by the appended claims.

What is claimed is:

1. In a mounting of the character described, the combination of a bracket consisting of a flat metal structure folded transversely of its own plane to general oblong shape with its long sides disposed horizontally and formed with a slot completely across one of said long sides midway between the ends thereof, a body of rubber peripherally encompassed by said bracket and bonded to the walls thereof, the lateral faces of said body being totally exposed, and a metal plate embedded in said rubber body midway between the sides thereof and parallel to said long sides, said insert comprising an integral stud that extends to the exterior of the bracket through said slot in a long side thereof, the rubber body being formed with a recess extending from one lateral face thereof to the other and being of the same width as said slot to which it is open.

2. A combination as defined in claim 1 including a second transverse recess formed in the rubber body contiguous with the opposite long side of the bracket and extending from one lateral face of the rubber body to the other.

ELLWOOD F. RIESING.